May 12, 1953  C. B. DE VLIEG  2,638,010
TRANSMISSION UNIT
Filed Sept. 10, 1949  3 Sheets-Sheet 1

INVENTOR.
Charles B. De Vlieg
BY
McCanna & Morsbach
ATTYS.

May 12, 1953
C. B. DE VLIEG
2,638,010
TRANSMISSION UNIT
Filed Sept. 10, 1949
3 Sheets-Sheet 2
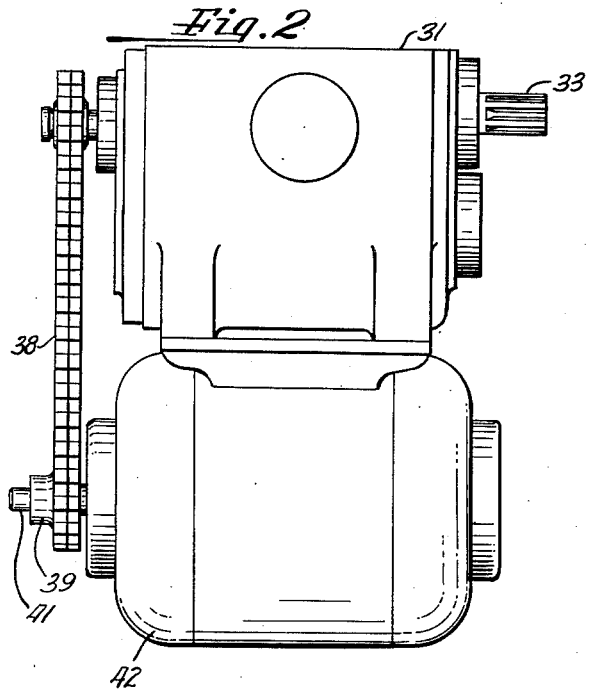
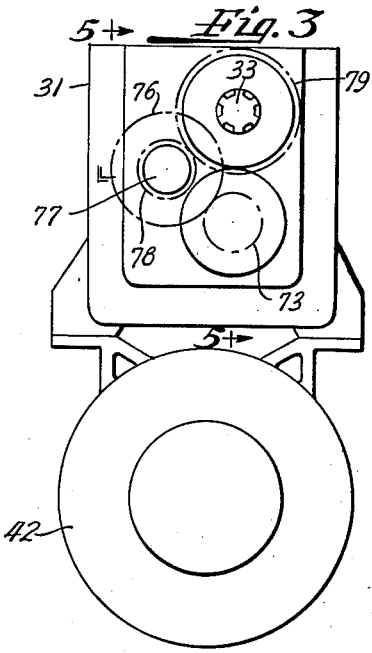
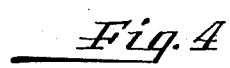
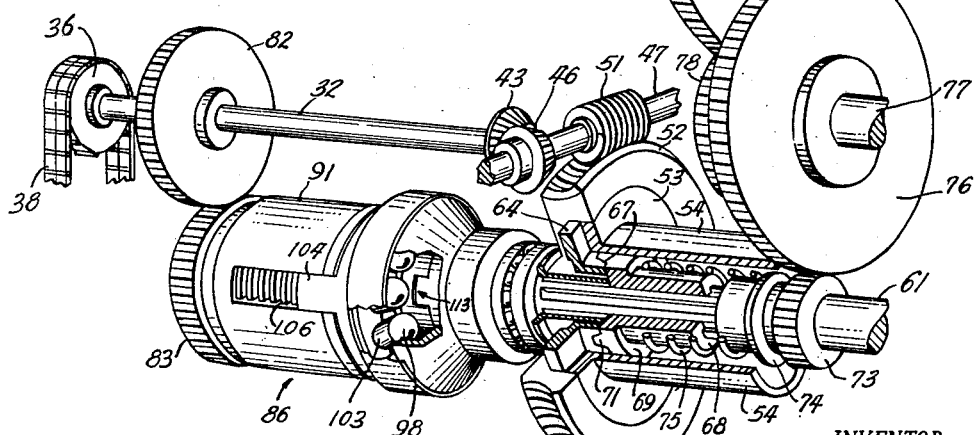
INVENTOR.
Charles B. De Vlieg
BY
McCanna & Morsbach
ATTYS.

May 12, 1953 C. B. DE VLIEG 2,638,010
TRANSMISSION UNIT
Filed Sept. 10, 1949 3 Sheets-Sheet 3
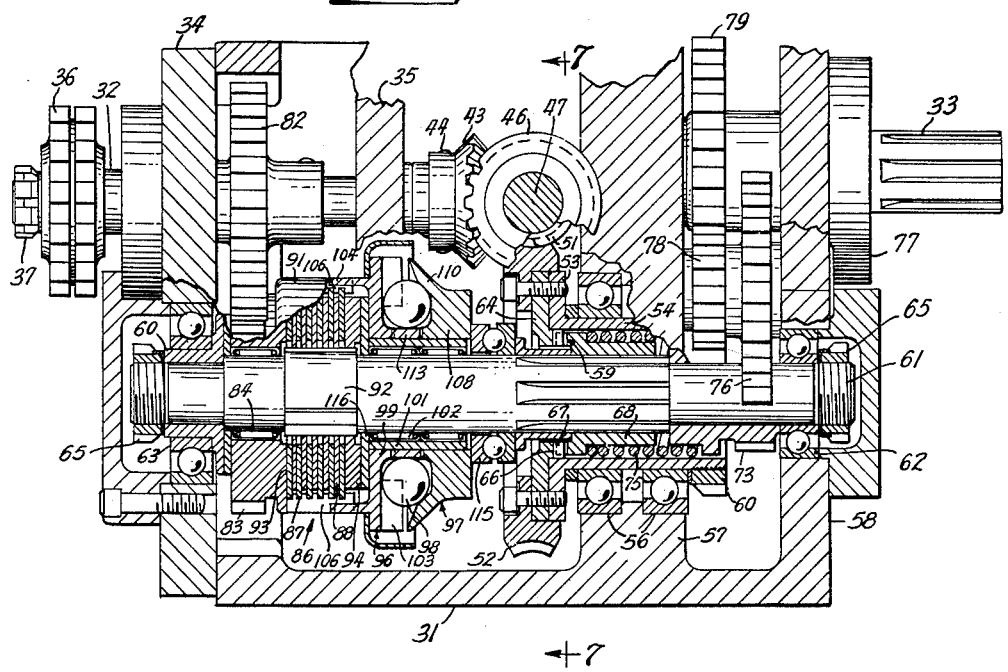
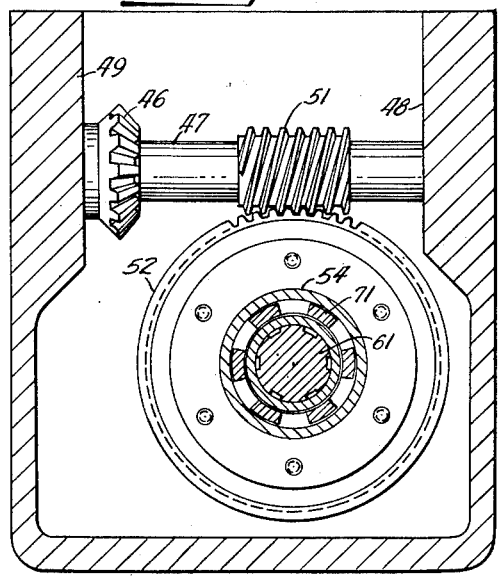
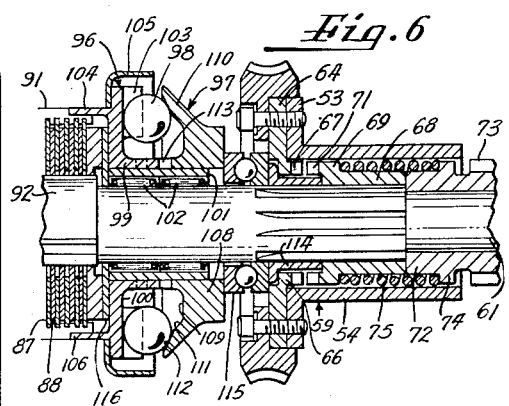
INVENTOR.
Charles B. De Vlieg
BY
McCanna & Morsbach
ATTYS.

Patented May 12, 1953

2,638,010

UNITED STATES PATENT OFFICE 2,638,010

TRANSMISSION UNIT

Charles B. De Vlieg, Farmington, Mich.

Application September 10, 1949, Serial No. 115,121

16 Claims. (Cl. 74—336)

This invention relates to transmission mechanism for general application and has more particular reference to a transmission unit for a machine tool.

In the operation of a machine tool, it frequently is desirable to operate the machine tool at a plurality of different speeds. For example, during the machining of a workpiece it is frequently desirable to move the workpiece at a relatively high speed during the positioning of the workpiece and then to move the workpiece at a relatively slow speed as it approaches a preselected position or when it is being machined. Heretofore in order to effect these different speeds a plurality of motors and/or a complicated transmission has been required. While a number of different constructions have been used they have not in general been entirely satisfactory due to the fact that they are so complicated. Another disadvantage is that they have required a considerable amount of space thereby making a large and bulky machine tool.

An object of this invention is the provision of a novel transmission mechanism or unit for transmitting power from a drive means to a driven means.

Another object of the invention is the provision of a novel transmission unit of the above character utilizing a plurality of power trains between drive means, operable at a plurality of speeds, and driven means having novel speed means responsive for automatically selectively effecting the power train between said drive means and driven means through which a driving connection is effected.

Another object of the invention is the provision of a novel transmission unit of the above character having novel speed responsive means.

Another object of the invention is the provision of a novel transmission unit wherein a high torque can be obtained at a low speed.

Another object of the invention is the provision of a novel transmission of the above character that is positive in its action, that is simple, that is compact and that is relatively inexpensive to produce.

Other objects and advantages of the invention will become apparent from the following detailed description taken in connection with the accompanying drawings, in which—

Fig. 2 is a side view of the transmission unit and the motor drive;

Fig. 3 is an end view of the transmission unit and motor as shown in Fig. 2;

Fig. 4 is a schematic view of the transmission unit with portions of the components cutaway to show details of construction;

Fig. 5 is a sectional view taken substantially along the line 5—5 of Fig. 3 with the movable elements of the speed responsive means in a retracted position;

Fig. 6 is a fragmentary sectional view similar to Fig. 5 showing the relative position of the components of the transmission unit when the elements of the speed responsive means are in an extended or actuating position, and Fig. 7 is a transverse sectional view taken substantially along the line 7—7 of Fig. 5.

Figure 1:
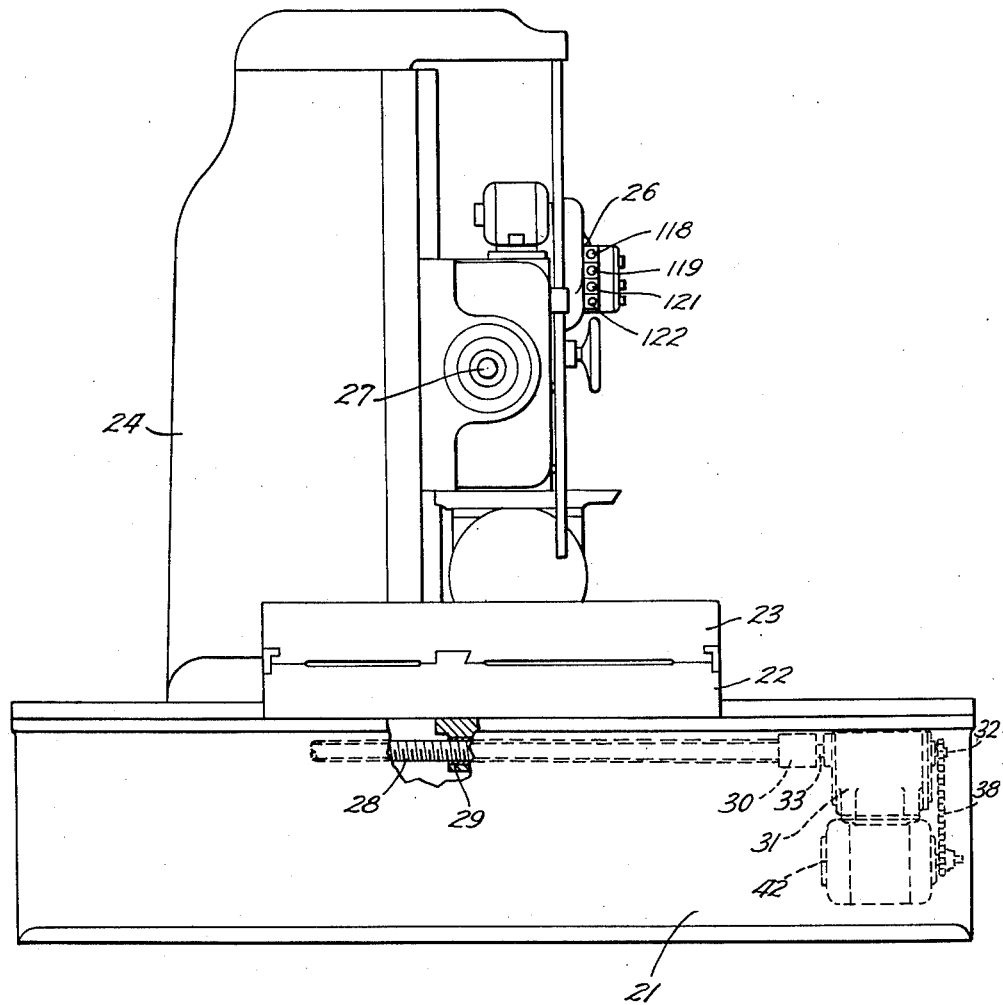
Figure 1 is a side elevational view of a machine tool embodying the present invention.

Referring now to the drawings the invention is shown embodied in a transmission unit adapted for general application. The transmission unit includes driving means, operative at either of two preselected speeds, driven means, first power train means operative when said driving means is driven at one of said preselected speeds for effecting a first driving connection between said driving means and said driven means to drive the latter at a preselected speed, and second power train means operative when said driving means is driven at the other of its preselected speeds to disconnect the driving connection between said driven means and said driving means through said first power train means and to effect a second driving connection between the drive means and the driven means to drive the latter at another speed.

For purposes of illustrating the invention the transmission unit is shown as applied to a machine tool (see Figure 1) having a base 21, a saddle 22 mounted on the base for reciprocation lengthwise of the base, a platen 23 for supporting a workpiece and mounted on the saddle for movement in a direction transversely of the base, a column 24 mounted at one side of the base, a spindle head 26 mounted on the column for vertical movement, a spindle 27 rotatably mounted on the spindle head 26 for supporting a tool and suitable controls, not shown, for controlling the operation of the aforegoing described members. In the present instance the movement of the saddle 22 is controlled by a lead screw 28 extending lengthwise of the base 21 as shown in Figure 1. The lead screw is suitably supported, not shown, in the base 21 and is utilized to transmit power for controlling the movements of the components such as the saddle 22 of the jig mill. The lead screw 28 is connected to the saddle 22 through a conventional connection 29. As best shown in Figure 1 the transmission unit is mounted at one end of the base 21 between the side walls thereof and is drivingly connected to the lead screw 28 through a suitable coupling 20.

The components of the transmission unit as best shown in Figs. 4, 5 and 7 are disposed in a suitable housing 31. A drive shaft 32 projects outwardly from one end of the housing and a power take-off or driven shaft 33 suitably journaled by the housing projects outwardly from the opposite end of the housing. The drive shaft 32 is suitably supported for rotation at spaced positions by an end wall 34 of the housing and a partition 35 spaced from the end wall 34. On the outer end of the drive shaft 32 is a sprocket 36 rigidly mounted thereon. A locknut 37 secures the sprocket against a shoulder formed on the shaft 32 by reducing the diameter of the outer end of the shaft. The sprocket 36 is shaped to be connected with a link chain 38 trained over a sprocket 39 on a shaft 41 of a motor 42. As shown in Fig. 2 the motor is rigidly attached to the bottom of the housing 31 as by having the mounting base of the motor seated against the mounting base of the housing. Thus the transmission unit is disposed immediately above the motor. The motor 42 may be of any conventional construction having two speeds of operation in both a forward and a reverse direction of rotation.

A power train is disposed between the drive shaft 32 and the driven shaft 33 so that at one speed of the motor 42 the driven shaft 33 is rotated at a preselected speed to drive the lead screw 28. As best shown in Fig. 5 the power train includes a bevel gear 43 secured on the end of the shaft 32 extending through the partition 35 as by a pin 44. The bevel gear 43 is arranged to mesh with a bevel gear 46 mounted on a shaft 47. The latter extends transversely of the housing 31 and is suitably supported for rotation by the side walls 48 and 49 of the housing 31 as shown in Fig. 7. Intermediate the ends of the shaft 47 and spaced from the gear 46 is a worm 51 shaped to mesh with a gear 52. The latter as best shown in Fig. 5 is secured to a radially extending flange 53 formed at one end of a sleeve 54 rotatably supported by spaced bearings 56. The latter are retained in suitable recesses formed on opposite sides of a partition 57 spaced from the partition 35 and an end wall 58 of the housing 31. The gear 52 is also arranged to be connected, through a clutch 59 to a shaft 61 which may also be considered to be a driven shaft. The shaft 61 extends through the sleeve 54 and is supported at opposite ends of the housing 31. At one end of the housing 31, the shaft 61 is supported by a bearing 62 supported in a recess in the end wall 58. At the opposite end of the housing the shaft 61 is supported by a bushing 60 in turn supported by a bearing 63 retained in a suitable recess in the end wall 34. Suitable locknut assemblies 65 secure the bearing 62 and the bushing 63 on the shaft 61.

The clutch 59 in this embodiment of the invention comprises two members. One of the members is in the form of an annular disc 64 secured to the flange 53 of the rotatable sleeve 54. The central portion of the disc is formed with an aperture of greater diameter than the shaft 61 so that the disc encircles the shaft 61 and is in spaced relation thereto. The portion of the disc defining the aperture terminates in a flange 66 having axially facing annularly spaced teeth 67 (see Fig. 6) formed thereon. The other member of the clutch 59 is formed by a sleeve 68 mounted on the shaft 61 by a spline connection so that the sleeve 68 can rotate in unison therewith and also moves axially thereof between opposed positions. On its inner end the sleeve 68 terminates in a flange 69 having axially facing annularly spaced teeth 71 concentrically arranged with the shaft 61 and shaped to mesh with the teeth 67. The sleeve is movable between a position in which the teeth 71 engage the teeth 67 and a position in which the sleeve 68 abuts against a mounting collar 72 of a gear 73. In the latter position of the sleeve 68, the teeth 71 are out of mesh with the teeth 67. The teeth 71 are normally urged to a position in which the teeth 71 engage the teeth 67 (see Fig. 5) by a compression spring 75. The latter is disposed on the interior of the sleeve 54 and acts between the flange 69 and a shoulder 74 formed on the collar 72. The gear 73 is rigidly attached to the shaft 61 and meshes with a spur gear 76 (see Fig. 4). The latter is supported on a shaft 77 between the partition 57 and the end wall 58, the shaft being supported by the partition and the end wall respectively. Directly connected with the gear 76 is a pinion 78 shaped to mesh with a spur gear 79 rigidly secured to the shaft 33.

Another power train is also operable between the driving shaft 32 and the shaft 61 and in turn the shaft 33 to effect a driving connection between the shafts that drives the driven shaft 33 at a different speed then with the aforegoing described power train. The second power train includes a gear 82 mounted on the shaft 32. The gear 82 is rigidly secured to the shaft 32 and is disposed between the end wall 34 and the partition 35. The gear 82 is shaped to mesh with a gear 83 rotatably supported on the shaft 61 by roller bearings 84 (see Fig. 5). The gear 83 is connected to the shaft through a clutch 86. As best shown in Fig. 5 the clutch is of conventional construction and includes a plurality of discs 87 and 88 in side by side relation. The discs 87 are formed on their peripheries with radially extending projections shaped to be received in axially extending grooves formed in a sleeve 91 rigidly attached to the gear 83. The discs 88 have a smooth outer periphery but are formed with a central aperture having projections extending radially inwardly to be received in axial extending grooves formed on an enlarged portion 92 on the shaft 61 intermediate the ends of the latter. At one end the stack of discs is positioned to abut against an abutment 93 formed adjacent the gear 83 and integral therewith. At the opposite end the stack of discs is positioned to be engaged by an axially movable abutment 94 movable to effect a frictional engagement of the discs 87 with the discs 88. When the abutment 94 is in the position shown in Fig. 5 the discs 87 and 88 are in a disengaged position and the sleeve portion 91 rotates relative to the shaft 61. When the abutment 94 is in the position shown in Fig. 6 the discs 87 and 88 are in a frictionally engaged position and the shaft 61 turns in unison with the gear 83.

Speed responsive means is mounted on the shaft 61 for automatically selectively controlling the operation of the clutch units 59 and 86. As best shown in Fig. 5 the speed responsive means is mounted on the shaft 61 between the clutches 59 and 86. In this instance the speed responsive unit comprises a pair of members 96 and 97 and a plurality of annularly spaced balls 98 disposed between the members and shaped to move between different radial positions in response to different speeds of operation of the drive shaft 32. The members 96 and 97 are arranged so that when the balls are in an inner or retracted position the members are in closely spaced relation and when the balls are in an outer position the members are forced apart. The member 96 is formed by a generally disc-shaped body having a sleeve 99 shaped to be mounted on a bushing 101 in turn supported on roller bearings 102 acting between the bushing 101 and the shaft 61. One axial face of the members 96 is formed with a plurality of radially extending recesses 103 shaped to receive the balls 98. The recesses 103 are of such depth that a portion of each ball projects out of its respective recess. Each recess extends from an annular recess 100 formed in the body adjacent the sleeve 99 to the periphery of the member 96. On its opposite axial face the member 96 is formed with axially extending tongues 104 shaped to be received in recesses 106 formed on the sleeve 91. The member 97 includes a sleeve 108 for mounting the member on the bushing 101 in side by side relation with the member 96. Projecting outwardly from the sleeve 108 is a flange 110 inclined generally toward the member 96. The flange is shaped to define a surface 109 disposed radially of the sleeve 108, a surface 111 inclined at an angle to the surface 109 in a direction toward the member 96 and a surface 112 extending outwardly from the surface 111 and inclined less sharply toward the member 96 than the surface 111. The sleeve 99 is connected to the sleeve 108 through a tongue and slot connection 113. Thus the sleeves rotate in unison but are free to move axially relative to each other. The members 96 and 97 are arranged so that when the balls 98 move from the position shown in Fig. 5 to the position shown in Fig. 6 the portion of the balls projecting from recesses engages the surface 111 and 112 to cam or wedge the members 96 and 97 apart. To permit relative rotation movement of the members 96 and 97 with respect to the shaft 61 the member 97 abuts against a thrust bearing 115 and the member 96 abuts against a thrust washer 116 in side by side contiguous relation with the movable abutment 94.

Any suitable two speed reversing control system may be utilized for controlling the operation of the motor. Preferably four push button stations, 118, 119, 121 and 122 (see Figure 1) for actuating the control system are mounted on the spindle gear 26 to be accessible to the operator. The push buttons should preferably be marked to indicate the function of the machine that occurs when they are depressed. For example the push buttons 118, 119, 121 and 122 may be marked respectively, FF, FS, RF and RS. When the push button 118, marked FF, is depressed the high speed winding of the motor 42 is energized and the saddle 22 moves forwardly (from the front to the back of the machine) at a rapid rate. When the push button 119 marked FS is depressed, the low speed winding of the motor is energized and effects forward movement of the saddle at a slow or feed rate. When the push button 121, marked RF, is depressed, the high speed winding of the motor 42 is energized and the saddle 22 moves rearwardly (back to front) at a rapid rate. When the push button 122, marked RS, is depressed, the low speed winding of the motor 42 is energized so that the saddle 22 moves rearwardly at a slow or feed rate.

To simplify the drawings the wiring diagram has been omitted.

The operation of the transmission is as follows: Assume that the saddle 22 is adjacent the end of the base 21 on which the transmission unit (see Figure 1) is mounted and that no power is being transmitted through the transmission from the motor 42. Under these conditions the components of the transmission are in the position shown in Fig. 5. Therein it will be noted the teeth 71 on the sleeve 68 of the clutch 59 are urged into engagement with the teeth 67 of the disc 64 by the spring 75 so that a driving connection exists between the drive shaft 32 and the driven shaft 33. The balls 98 in the speed responsive means are at their inner radial position resting on the sleeves 99 and 108 of the members 96 and 97, respectively, and the discs 87 and the discs 88 in the clutch 86 are in a disengaged position. Assume that it is desired to advance the table to a preselected position adjacent the spindle. The operator first depresses the push button 118. This energizes the high speed winding of the motor 42 and the shaft 32 is driven at a relatively high speed through the chain 38. The gear 82 rotates in unison with the shaft 32 and meshes with the gear 83 to drive the sleeve 91 and the member 96 through the tongue 104 and slot 106 (see Fig. 6) connects therebetween. The member 97 is connected with the member 96 through the tongue and slot connections 113 and is driven simultaneously therewith. As the speed of rotation of the members 96 and 97 increases the balls 98 move outwardly under centrifugal force from the position shown in Fig. 5. When the speed of rotation reaches a preselected value the balls 98 move under centrifugal force to assume the position shown in Fig. 6. As the balls move outwardly they act in a wedging or camming action between the members 96 and the member 97. Thus they act against the bottom of the recess for receiving the balls 98 and the inclined surfaces 111 and 112 of the member 97 to force the members 96 and 97 axially apart. During the radial movement of the balls the side walls of the grooves act as radial guides for the balls. As the members move apart the sleeve 68 is forced to the right against the collar 72 through the spacer 114 and the thrust bearing 115. As the sleeve member 68 is so moved axially the teeth 71 are moved out of engagement with the teeth 67 thereby effecting disengagement of the clutch means 59 in the first driving train between the shaft 32 and the shaft 33. The sharply inclined surface 111 of the speed responsive mechanism assures that the sleeve 68 is moved axially quickly to prevent possible damage to the clutch teeth and to assure a quick positive disengagement of the clutch 59. Simultaneously with movement of the sleeve 68 against the collar 72, the member 96 moves against the washer 116 and forces the abutment 94 axially in the opposite direction so that the discs 87 and 88 are clamped between the abutment 93 and the abutment 94. This establishes a frictional driving connection between the sleeve member 91 and the shaft 61. Rotation of the shaft 61 effects rotation of the spur gear 73 with the spur gear 76. The latter is directly connected with the gear 78 which in turn meshes with a gear 79 rigidly mounted on the shaft 33. The shaft 33 is thus driven at a relatively high speed of rotation by one of the power trains in the transmission unit.

When the saddle 22 approaches a preselected position the push button 118 will be released and the push button 119 situated. This operation may be manually performed, or suitable means may be employed for automatically controlling the operation of suitable circuit opening and closing means. In depressing the push button 119 the low speed windings of the motor 42 are energized. As a consequence the shaft 32 is driven through the chain 38 at a relatively low speed of operation. Upon decrease in speed of rotation of the shaft 32 the gear 82 in turn rotates at a slower speed and in turn drives the gear 83 and speed responsive means at a slower speed. As the speed of rotation decreases centrifugal force which maintains the balls 98 in their outward position decreases. As a consequence the balls 98 tend to move radially inwardly toward the position they assume as shown in Fig. 5. When the speed is sufficiently reduced the force of the spring 75 becomes sufficiently great to overcome the centrifugal force of the balls and force the sleeve 68 axially to the left so that the teeth 71 mesh with the teeth 67. In moving axially the sleeve 68 moves away from its contact with the collar 72 of the gear 73 and consequently releases the clamping pressure acting between the discs 87 and 88 of the clutch means 86. When the balls 98 move to the position shown in Fig. 5 the clutch 86 is in a disengaged position. When the teeth 71 engages the teeth 67 a driving connection is established from the drive shaft 32 through the bevel gear 43, the bevel gear 46, the shaft 47, the worm 51, the worm gear 42, and the clutch 59 to the shaft 61. The shaft 61 is connected to the drive shaft 33 through the gears 76, 78 and 79 to effect rotation of the latter. Under these circumstances the drive shaft 33 rotates at a relatively low speed. As a consequence the forward movement of the saddle 22 is at a relatively slow rate. When the saddle is in the desired position the operator releases the push button 119 and the saddle comes to rest.

After the desired machining of the workpiece has been effected the operator depresses the push button 121 which energizes the motor 42 so that it operates in the reverse direction of rotation to that just described. Under these circumstances the drive shaft 32 operates in the reverse direction of rotation. The components of the transmission unit are arranged to operate equally well irrespective of the direction of rotation of the drive shaft 32. Accordingly when the push button 121 is depressed the saddle 22 moves from the back of the machine to the front at a relatively fast speed. Similarly, if the operator depresses the push button 122 the transmission unit operates in the same manner as that described above under the conditions when the push button 119 is depressed except that the components of the transmission unit operate in the reverse direction of rotation.

While I have shown a push button control for the mechanism it will be obvious that other forms of control may be used for starting and stopping the motor forward and reverse as well as high and low speeds. Consequently the invention is particularly well adapted for use in machines having automatic controls for predetermined operations.

It is also contemplated that my invention is adapted for a wide range of uses wherever power transmission is desired of the type herein disclosed.

The above construction has many advantages. It is simple and can be manufactured at a relatively low cost. Moreover, this above construction provides a transmission that automatically pre-positions the components of the unit to preselected positions in response to the speed of the driving unit so that the proper driving connection between the driving and driven means is always effected. One of the features of the transmission is the provision of single motor power source having high and low speeds and reversing. Another feature is the compact arrangement and coordination of parts. Another feature is the relatively simple and inexpensive control means.

It should be further noted that in the present embodiment of my invention I have provided a two speed driving means preferably in the form of an electric motor having a high speed of 1800 R. P. M. and a low speed of 600 R. P. M., giving a 3 to 1 ratio. Through the novel transmission mechanism above described this power from the electric motor is delivered in a high to low ratio of 200 to 1. In actual practice in a machine tool or in any desired application the resultant power at the high speed will propel a tool or a work carriage at a rate of 120" per minute and at the low speed it will propel the carriage at a .6" per minute, or at a ratio of 200 to 1 as compared with the driving ratio of 3 to 1. This transmission mechanism is particularly advantageous in machine tools but it is also applicable to other mechanism.

While I have shown one embodiment of my invention it will be understood that I do not wish to be limited thereto since many modifications may be made, and I therefore contemplate by the claims to cover such modifications as fall within the true spirit and scope of my invention.

I claim:

1. In a transmission unit for a machine tool, the combination of a drive shaft, means for driving said shaft at a low speed and a high speed, a driven shaft, a first power train between said drive shaft and said driven shaft including speed reduction gearing the final gear of which is freely rotatable about the driven shaft concentric therewith and a first clutch mounted on said driven shaft and operable to effect a connection between said final gear and said driven shaft having a given high to low ratio at said low speed, a second power train between said drive shaft and said driven shaft including gearing terminating in a final gear freely rotatable about the driven shaft concentric therewith and a second clutch mounted on said driven shaft and operable to effect a connection between said final gear of the second gear train and said driven shaft, and speed responsive means driven by said second power train and mounted on said driven shaft and operable to disengage said first clutch and engage said second clutch when said drive shaft is driven at said high speed whereby a relatively high to low ratio is obtained between the drive shaft and the driven shaft when the drive shaft is operated at the high speed compared with said high to low ratio between said shafts when the drive shaft is operated at the low speed.

2. In a transmission unit, the combination of a first shaft, means for driving said shaft at a low speed and a high speed, a second shaft, a first power train operatively connected to said first shaft and including gearing the final gear of which is freely rotatable about the second shaft concentric therewith, jaw clutch means normally in an engaged position between said final gear and said second shaft operable when said first shaft is driven at said low speed to effect a driving connection between said first shaft and said second shaft to drive the second shaft at a given high to low ratio, a second power train operatively connected to said first shaft including gearing terminating in a final gear freely rotatable about the driven shaft concentric therewith, friction clutch means between said second power train and said final gear of the second shaft operable to effect a driving connection between said first and second shafts, and speed responsive means operatively connected with said jaw clutch and said friction clutch means to effect disengagement of said jaw clutch means when said first shaft is driven at said high speed and to effect engagement of said friction clutch means whereby to drive said second shaft at a high to low ratio substantially greater than the said high to low ratio between the first and second shafts when the first shaft is driven at the low speed.

3. In a transmission unit, the combination of driving means selectively operable at each of a plurality of preselected speeds, a driven shaft, a first power train between said driving means and said driven shaft including gearing the final gear of which is freely rotatable about said driven shaft concentric therewith, a jaw clutch mounted on said driven shaft and coacting with said final gear, the jaw clutch having operating positions one in which the driven shaft is disconnected from said final gear and the other in which the final gear is drivingly connected with the driven shaft, a second power train between said driving means and said driven shaft including gearing the final gear of which is freely rotatable about said driven shaft concentric therewith, a second clutch mounted on said driven shaft and coacting with the final gear of said second power train, said second clutch having operating positions one in which the driven shaft is disconnected from the second mentioned final gear and the other in which said second mentioned final gear is drivingly connected with the driven shaft, and means mounted on said driven shaft responsive to the speed of rotation of the final gear of said second power train for automatically engaging said jaw clutch and disengaging said second clutch when the driving means operates at one of said preselected speeds and for engaging the second clutch and disengaging the jaw clutch when the driving means operates at the other of its preselected speeds.

4. In a transmission unit, the combination of a drive shaft operable at either low or high preselected speeds, a driven shaft, a first power train between said drive shaft and said driven shaft including a first clutch mounted on said driven shaft and having an engaged position in which it effects a driving connection between said drive shaft and said driven shaft and a disengaged position in which it disconnects the drive shaft from the driven shaft, means normally urging said clutch to its engaged position, the drive to the driven shaft through the first power train having a given high to low ratio when the drive shaft is operated at the low speed, a second power train between said drive shaft and said driven shaft including a second clutch having an engaged position in which the second clutch effects a driving connection between said drive shaft and said driven shaft and a disengaged position in which it disconnects the drive shaft from said driven shaft, and speed responsive means including a first member driven by said second power train, said first member being mounted adjacent said first clutch and movable to move said first clutch from its engaged to its disengaged position, a second member driven by said second power train, said second member mounted adjacent said second clutch and movable to move said second clutch from its disengaged to its engaged position, and means acting between said first and second members responsive at a preselected speed of said drive shaft to move said first and second members to disengage said first clutch and engage said second clutch, the drive to the driven shaft through the second power means when the drive shaft is operated at the high speed having a high to low ratio substantially greater than said high to low ratio between the drive and driven shaft when the drive shaft is operated at the low speed.

5. In a transmission unit, the combination of a drive shaft, means for driving said drive shaft at either of two preselected speeds, a driven shaft, a first power train between said drive shaft and said driven shaft including a first clutch having an engaged and a disengaged position, means normally urging said clutch to its engaged position to effect a driving connection between said drive shaft and said driven shaft when said drive shaft is driven at one of said speeds, a second power train connected between said drive shaft and said driven shaft including a second clutch having an engaged and a disengaged position, a first member mounted on said driven shaft and operatively associated with said first clutch, said first member being movable axially to move said first clutch from its engaged to its disengaged position, a second member driven by said second power train and operatively associated with said second clutch, said second member being mounted on said driven shaft for axial movement to move said second clutch from a disengaged to an engaged position, one of said members having a radially extending flange inclined toward the other member to define an inclined surface and the other of said members having annularly spaced radially extending grooves and a ball disposed in each groove having a portion engageable with the inclined surface, said balls being responsive when said drive shaft is driven at its other speed to move radially outwardly to move said members axially to disengage said first clutch and engage said second clutch.

6. The combination recited in claim 5 with means for limiting movement of the balls between preselected radial positions.

7. In a transmission unit, the combination of a drive shaft, means for driving said shaft at either of two preselected speeds, a driven shaft, a first power train between said drive shaft and said driven shaft including a first clutch having an engaged and a disengaged position, means normally urging said first clutch to its engaged position to effect a driving connection between said drive shaft and said driven shaft when said drive shaft is driven at one of said speeds, a second power train connected between said drive shaft and said driven shaft including a second clutch having an engaged and a disengaged position, a first member mounted on said driven shaft and operatively associated with said first clutch, said first member being movable axially to move said first clutch from its engaged to its disengaged position, a second member driven by said second power train and operatively associated with said second clutch, said second member being mounted on said driven shaft for axial movement to move said first clutch from a disengaged to an engaged position, one of said members having annularly spaced radially extending grooves and the other member having a flange with a first surface inclined sharply toward said other member and a second surface inclined less sharply toward the other member and extending outwardly from the first surface and a ball in each groove having a portion engageable with said flange, said balls being responsive, when said drive shaft is driven at its other speed to move radially outwardly, to move said first and second members axially to disengage said first clutch and engage said second clutch, said balls in moving relative to the first surface causing the members to be moved axially rapidly and when engaging the second surface maintaining the members to hold the first clutch in a disengaged position and the second clutch in an engaged position.

8. In a transmission unit, the combination of a drive shaft operable at either of two preselected speeds, a driven shaft, a first power train connected between said drive shaft and said driven shaft including a first clutch having a member mounted on said driven shaft and movable between opposed axial positions, in a first axial position of said member said clutch effecting a driving connection between said drive shaft and said driven shaft through said first power train and in a second axial position of said member said clutch disconnecting the drive shaft from the driven shaft, means normally biasing said member to said first position, a second power train connected between said drive shaft and said driven shaft including a second clutch having a second member mounted on said driven shaft and movable between opposed positions, said second member being spaced from said first member, in a first axial position of said second member said second clutch effecting a driving connection between the drive shaft and the driven shaft through said second power train and in a second axial position of said second member said second clutch disconnecting the drive shaft from the driven shaft, a first generally disc-shaped body driven by said second power train and mounted on said driven shaft between said first and second members for axial movement, said body having an axial face with annularly spaced radially extending grooves, a second generally disc-shaped body driven by said second power train and mounted on said drive shaft for axial movement between said first and second members, said second body having a radially extending flange inclined generally toward said first body and a ball disposed in each groove acting between said axial face and said inclined flange when said drive shaft is driven at one of said speeds to move said first and second bodies apart to disengage said first clutch and engage said second clutch and to effect movement of said first and second bodies to disengage said second clutch and engage said first clutch when said drive shaft is driven at the other of said speeds.

9. In a transmission unit, the combination of a drive shaft, means for driving said shaft at either of two preselected speeds, a driven shaft, a gear train connected to said drive shaft including a gear concentrically arranged with said driven shaft, said gear having annularly spaced axially extending clutch teeth, a sleeve mounted on said driven shaft and terminating at one end in annularly spaced axially extending clutch teeth shaped to mesh with the clutch teeth on said first flange, said sleeve being movable between first and second axial positions, in said first position of the sleeve the clutch teeth of said sleeve meshing with the clutch teeth on said disc and in the second position of the sleeve the clutch teeth on said sleeve being disengaged from the teeth on said gear, spring means normally biasing said sleeve to the first position, a second power train connected between said drive shaft and said driven shaft including a clutch, and speed responsive means driven by said drive shaft and operable in response to its speed of rotation when said drive shaft is driven at one of said speeds to effect a driving connection between the drive shaft and the driven shaft through the first mentioned gear train, gear, and clutch teeth and operable in response to its speed of rotation when said drive shaft is driven at its other speed to move said sleeve to its second position and to actuate said second clutch to effect a driving connection between the drive shaft and the driven shaft through said second power train.

10. In a transmission unit, the combination of a drive shaft, means for driving said shaft at either of two preselected speeds, a first power train between said drive shaft and said driven shaft including a clutch having an engaged and a disengaged position, means for urging said clutch to its engaged position to effect a driving connection between the drive shaft and the driven shaft when the drive shaft is driven at one of said speeds, a gear train connected to said drive shaft including a sleeve member concentrically arranged with said driven shaft, a plurality of spaced discs concentrically arranged with said driven shaft and mounted in said sleeve member to rotate in unison therewith, a plurality of second discs alternately disposed with respect to said first discs and mounted to rotate in unison with said driven shaft, said first and second discs being mounted for axial movement with respect to said driven shaft, and speed responsive means driven by said drive shaft and operable in response to its speed of rotation when said drive shaft is driven at one of said speeds to effect a driving connection between the drive shaft and the driven shaft through the first mentioned gear train and operable in response to its speed of rotation when said drive shaft is driven at its other speed to effect disengagement of the first clutch and movement of the first and second discs into frictional engagement to effect a driving connection between the drive shaft and the driven shaft.

11. In a transmission unit, the combination of a drive shaft, means for driving said shaft at a high speed and a low speed, a driven shaft disposed at one side of the drive shaft, a gear train connected to said drive shaft including a gear concentrically arranged with said driven shaft, said gear having a flange with angularly spaced axially extending clutch teeth, a sleeve mounted on said driven shaft and terminating at one end in a second flange, said second flange having annularly spaced axially extending clutch teeth shaped to mesh with the teeth on said first flange, said sleeve being movable between first and second axial positions, in said first position of the sleeve the teeth of said sleeve meshing with the clutch teeth on said gear and in the second position of the sleeve the clutch teeth on said sleeve being disengaged from the clutch teeth on said gear, spring means acting to normally bias said sleeve to the first position, a second power train connected between said drive shaft and said driven shaft including a clutch mounted on the driven shaft, and speed responsive means mounted on said driven shaft between said gear and said clutch and driven by said drive shaft, said speed responsive means being operable when said drive shaft is driven at said low speed to effect a driving connection between the drive shaft and the driven shaft through the first mentioned gear train, gear, and clutch teeth and operable when said drive shaft is driven at said high speed to move said sleeve to its second position and to actuate said second clutch to effect a driving connection between the drive shaft and the driven shaft through said second power train.

12. A speed-change transmission for a machine tool or the like wherein to transmit a rapid-traverse speed and a feed speed forward and reverse comprising in combination, a prime mover adapted for selective operation at a high and a low speed adapted for said rapid-traverse and feed speeds, respectively, a driven shaft for transmitting to a machine tool element or the like said rapid-traverse and feed speeds, a first power train between said prime mover and said driven shaft for operating the driven shaft at a given high to low ratio when the prime mover is operated at the low speed, a second power train between said prime mover and said driven shaft for operating the driven shaft at a given high to low ratio when the prime mover is operated at the high speed, the high to low ratio of said second power train being substantially greater than the high to low ratio of said first power train, and speed responsive means operated by the prime mover and coacting with said first and second power trains to automatically effect inoperativeness of the first power train to perform its described function and operativeness of the second power train to perform its described function when said speed responsive means reaches a predetermined speed.

13. A speed-change transmission for a machine tool or the like wherein to transmit a rapid-traverse speed and a feed speed forward and reverse comprising in combination, a prime mover adapted for selective operation at a high and a low speed adapted for said rapid-traverse and feed speeds, respectively, a driving train driven by said prime mover, a driven shaft for transmitting to a machine tool element said rapid-traverse and feed speeds, a worm gear freely rotatable about said driven shaft concentric therewith, a worm pinion meshing with said worm gear and driven by said driving train, a first clutch for engaging and disengaging said worm gear and driven shaft, a gear train driven by said driving train and including a final gear freely rotatable about said driven shaft concentric therewith, a second clutch for engaging and disengaging said final gear and driven shaft, said first clutch being engaged and said second clutch disengaged when operating the prime mover at the low speed, and speed responsive means driven by the prime mover and coacting with said clutches to automatically effect disengagement of the first clutch and engagement of the second clutch when the prime mover is operated at the high speed.

14. A speed-change transmission for a speed machine tool or the like wherein to transmit a rapid-traverse speed and a feed speed forward and reverse comprising in combination, a prime mover adapted for selective operation at a high and a low speed adapted for said rapid-traverse and feed speeds, respectively, a driving train including a drive shaft connected for operation by said prime mover, a driven shaft for transmitting said rapid-traverse and feed speeds, a worm gear freely rotatable about the driven shaft concentric therewith, a worm pinion meshing with said driving train including the worm gear and driven by said driving train, a first clutch for engaging and disengaging the worm gear and the driven shaft, a gear train driven by the drive shaft and including a final gear freely rotatable about the driven shaft concentric therewith, a second clutch for engaging and disengaging said final gear and said driven shaft, said first clutch being engaged and said second clutch disengaged when operating the prime mover at the low speed, and speed responsive means driven by said driving train and coacting with said clutches to automatically effect disengagement of said first clutch and engagement of said second clutch when the prime mover is operated at the high speed.

15. In speed-changing mechanisms, the combination of a gearing mechanism having a driving train including a drive shaft, a driven shaft parallel with and laterally spaced from the drive shaft, a worm gear mounted for free rotation about the driven shaft concentric therewith, a worm pinion meshing with the worm gear and driven by said driving train, a sleeve member splined on the driven shaft, coacting clutch teeth between said worm gear and said sleeve member normally held in engagement and adapted to be disengaged by axial movement of the sleeve member, a gear train including a gear fixed to the drive shaft and a gear mounted for free rotation about the driven shaft concentric therewith, a friction clutch on the driven member concentric therewith including a member driven by said free rotation gear on the driven shaft and a member movable axially of the driven shaft for engaging and disengaging the friction clutch, and speed responsive means on the driven shaft concentric therewith and interposed between said friction clutch and said worm gear, said speed responsive means being driven by said driving train and coacting with said sleeve member to effect disengagement of said clutch teeth and coacting with the axially movable member of said friction clutch to effect engagement of said friction clutch.

16. Speed-changing mechanism as set forth in claim 15, in which the speed responsive means includes a plurality of ball weights freely responsive to centrifugal force and operating between opposed surfaces one of which coacts with the clutch sleeve member and the other with the axially movable member of the friction clutch, and wherein said surfaces are so shaped as to effect quick disengagement of the clutch teeth at a predetermined speed of the speed responsive means and to effect engagement of said friction clutch substantially simultaneously with and subsequent to said disengagement of the clutch teeth.

CHARLES B. DE VLIEG.

References Cited in the file of this patent

UNITED STATES PATENTS

| Number | Name | Date |
| --- | --- | --- |
| 1,789,053 | Schudeisky | Jan. 13, 1931 |
| 2,056,050 | Harris | Sept. 29, 1936 |
| 2,370,131 | Banker | Feb. 27, 1945 |
| 2,486,524 | Dulaney | Nov. 1, 1949 |
| 2,496,937 | Edwards | Feb. 7, 1950 |